United States Patent
Hofmann

(10) Patent No.: US 9,957,974 B2
(45) Date of Patent: May 1, 2018

(54) VACUUM PUMP

(71) Applicant: Pfeiffer Vacuum GmbH, Asslar (DE)

(72) Inventor: Bernd Hofmann, Wetzlar (DE)

(73) Assignee: PFEIFFER VACUUM GMBH, Asslar (DE)

(\*) Notice: Subject to any disclaimer, the term of this patent is extended or adjusted under 35 U.S.C. 154(b) by 502 days.

(21) Appl. No.: 14/526,620

(22) Filed: Oct. 29, 2014

(65) Prior Publication Data

US 2015/0115606 A1    Apr. 30, 2015

(30) Foreign Application Priority Data

Oct. 31, 2013    (DE) .................. 10 2013 222 167

(51) Int. Cl.
| | |
|---|---|
| F04D 19/04 | (2006.01) |
| F04D 29/60 | (2006.01) |
| F04D 29/62 | (2006.01) |
| F16L 23/024 | (2006.01) |
| F16L 23/032 | (2006.01) |
| F16L 37/26 | (2006.01) |
| F04D 29/40 | (2006.01) |
| F16L 23/00 | (2006.01) |

(52) U.S. Cl.
CPC .............. *F04D 29/40* (2013.01); *F04D 19/04* (2013.01); *F04D 19/042* (2013.01); *F04D 29/601* (2013.01); *F16L 23/00* (2013.01); *F16L 23/024* (2013.01); *F16L 23/032* (2013.01); *F16L 37/26* (2013.01)

(58) Field of Classification Search
CPC ...... F04D 26/601; F04D 19/04; F04D 19/042; F04D 29/601; F16L 37/26; F16L 23/00; F16L 23/003; F16L 23/006; F16L 23/02; F16L 23/024; F16L 23/032
USPC ...... 417/360, 363, 423.4, 423.15; 285/148.8, 285/148.25, 148.28, 405, 412, 414, 325, 285/363
See application file for complete search history.

(56) References Cited

U.S. PATENT DOCUMENTS

| | | | | |
|---|---|---|---|---|
| 823,346 A | * | 6/1906 | Maxwell | F16L 37/26 285/325 |
| 979,481 A | * | 12/1910 | Hannold | F16L 55/24 210/445 |
| 1,799,855 A | | 4/1931 | Mample | |
| 3,645,333 A | * | 2/1972 | Maass | E21B 33/00 166/85.2 |

(Continued)

FOREIGN PATENT DOCUMENTS

| | | |
|---|---|---|
| EP | 2228540 | 9/2010 |
| EP | 2273128 | 1/2011 |
| WO | 2020069814 | 6/2010 |

*Primary Examiner* — Peter J Bertheaud
(74) *Attorney, Agent, or Firm* — Abelman, Frayne & Schwab

(57) ABSTRACT

A receiving apparatus for the partial reception of a flange which is or can be connected to a vacuum pump, and having at least one fastening section for fastening to a recipient, at least one support section on which the flange lies in an assembly state and at least one receiving opening bounded by the support section, wherein the flange can be inserted into the receiving opening and can be pulled out of the receiving opening from an access side of the receiving apparatus with a receiving apparatus fastened to the recipient.

12 Claims, 4 Drawing Sheets

(56) References Cited

U.S. PATENT DOCUMENTS

| | | | | |
|---|---|---|---|---|
| 4,037,654 A | * | 7/1977 | Lien | E21B 33/00 166/85.2 |
| 4,886,426 A | * | 12/1989 | Surinak | F04D 29/607 285/24 |
| 6,854,956 B2 | * | 2/2005 | Miwata | F04D 29/601 415/143 |
| 7,798,788 B2 | | 9/2010 | Varennes | |
| 9,341,188 B2 | * | 5/2016 | Kogame | F04D 19/042 |
| 2003/0175113 A1 | | 9/2003 | Miwata | |
| 2008/0309071 A1 | | 12/2008 | Carboneri | |
| 2009/0006801 A1 | | 3/2009 | Kalisch | |

* cited by examiner

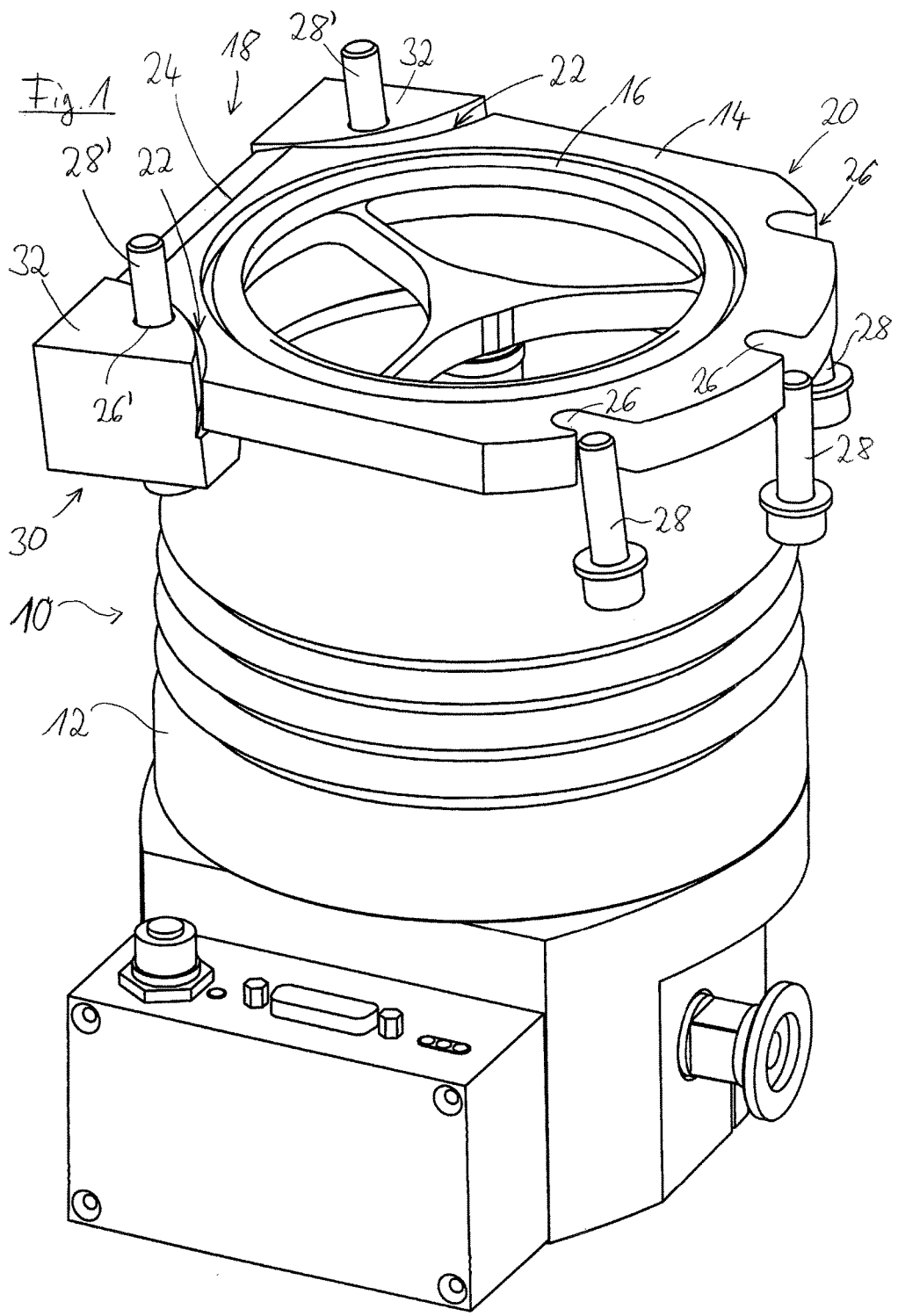

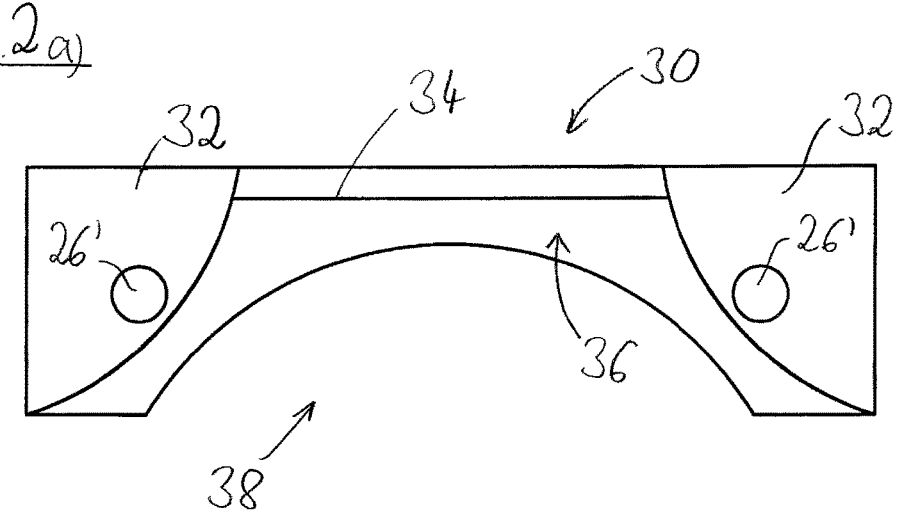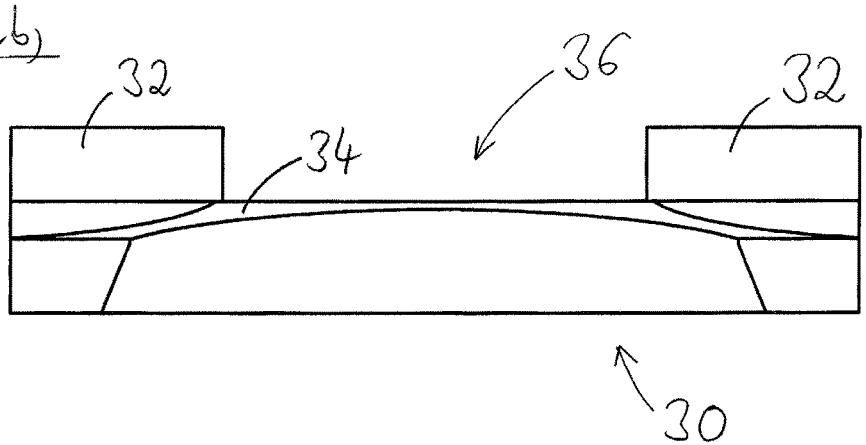

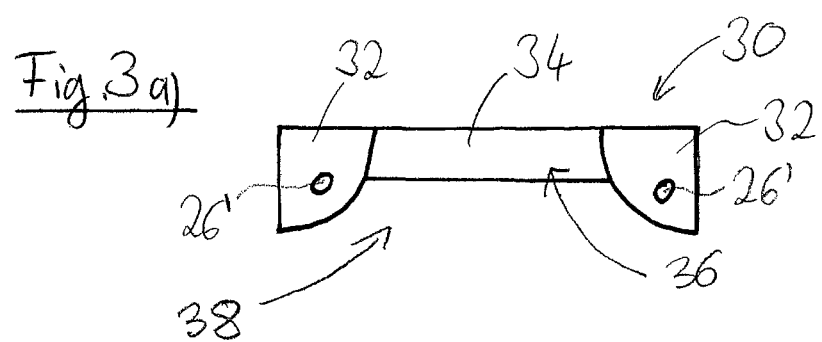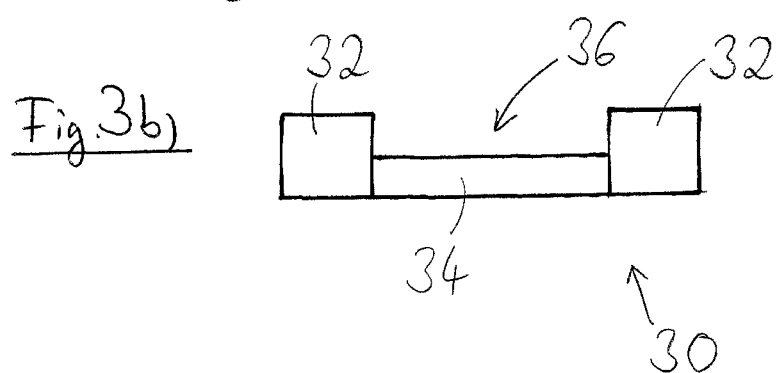

VACUUM PUMP

BACKGROUND OF THE INVENTION

1. Field of the Invention

The invention relates to a receiving apparatus for the partial reception of a flange of a vacuum pump. The invention further relates to a vacuum pump and to a system comprising a receiving apparatus and a vacuum pump.

2. Description of the Prior Art

It is generally known to fasten the flange of the vacuum pump to a recipient, for example to a container to be evacuated, with the aid of screws. However, the space in which the recipient is arranged is frequently restricted and tight. A fastening of the flange is consequently only possible with difficulty, if at all.

It is thus an object of the invention to facilitate the assembly and dismantling of a vacuum pump at a recipient, in particular at locations which are difficult to access.

SUMMARY OF THE INVENTION

This and other objects of the invention which will become apparent hereinafter are achieved with a receiving apparatus connectable to a vacuum pump and having at least one fastening section for fastening to a recipient, at least one support section on which a flange of the vacuum pump lies in an assembly state, and at least one receiving opening bounded by the support section, wherein the flange can be pushed into the receiving opening and can be pulled out of the receiving opening from an access side of the receiving apparatus, with a receiving apparatus fastened to the recipient.

The flange which can be received at least partly in the receiving apparatus can be directly connected to a vacuum pump. The flange and the vacuum pump can preferably be configured in one piece.

It is alternatively also possible that the flange can only be indirectly connected to the vacuum pump and e.g. forms part of an adapter. The vacuum pump can, for example, thus have a standard flange, in particular a so-called ISO-F flange, which can be connected to the adapter, in particular by fastening means such as screws. The adapter can in this respect comprise a standard flange, in particular an ISO-F flange, for fastening to the standard flange of the vacuum pump and can comprise the flange for receiving in the receiving apparatus. In this manner, conventional vacuum pumps which have a standard flange can also be retrofitted and can be received in the receiving apparatus in accordance with the invention.

The receiving apparatus comprises, in accordance with the invention, at least one fastening section for fastening to a recipient. The recipient can, for example, be a container which is to be evacuated. The recipient can in this respect comprise a standard flange, in particular an ISO-F flange. In this manner, conventional recipients can also be used.

The receiving apparatus furthermore comprises a support section on which the flange lies in an assembly state. The assembly state designates the state in which the vacuum pump is fixedly connected to the recipient or is at least positioned relative to the recipient, and indeed with the aid of the receiving apparatus in accordance with the invention, such that the vacuum pump can be fastened to the recipient.

At least one receiving opening is furthermore provided which is bounded by the support section. The receiving opening can in this respect be surrounded at all sides or have at least one open side.

In accordance with the invention, the flange can be pushed into the receiving opening and pulled out of the receiving opening from an access side of the receiving apparatus with a receiving apparatus fastened to the recipient.

The invention therefore makes it possible first to install the receiving apparatus at the recipient. Subsequently, the flange can be pushed into the receiving opening and can thereupon be fastened to the recipient or to a flange thereof. The flange is first pulled out of the receiving opening for removal. Subsequently, where required, the receiving apparatus can be dismantled from the recipient and removed.

In accordance with the invention, in this manner, a flange of a vacuum pump can also be fastened to a recipient at locations with difficult access and can be removed again. An assembly or dismantling is in particular only possible from one access direction.

In this manner, the assembly and dismantling of a vacuum pump at a recipient is facilitated.

Further developments of the invention are also set forth in the dependent claims, in the description and in the enclosed drawings.

In accordance with an embodiment, the support section is set back with respect to the fastening section at an upper side of the receiving apparatus facing the recipient in the assembly state. The upper side of the fastening section is thus in particular disposed higher than the upper side of the support section. In this manner, in particular the receiving opening is formed which can, for example, be configured as a type of slit or gap.

In accordance with a further embodiment, the fastening section projects beyond the support section at the access side of the receiving apparatus. The support section can in particular be set back at least partly with respect to the access side. It is also possible that the support section is adapted to the housing shape of the vacuum pump and is, for example, provided with a concave indentation for receiving a cylindrical pump housing.

The receiving apparatus and the flange can in particular be shaped such that a standard flange results overall in the assembly state. The surface bounded by the outline of the arrangement composed of the flange and the receiving apparatus in the assembly state is thus no larger than that of a standard flange and is preferably identical to a conventional flange.

In accordance with a further embodiment, two fastening sections and one carrier extending between the fastening sections and forming the support section are provided. The carrier can in particular be configured as a rail. The carrier can also form a support surface on which the lower side of the flange lies in the assembly state.

At least parts of the fastening sections as well as of the carrier can be configured as a common, single-piece component.

In accordance with a further development, the receiving apparatus is configured at least substantially in U shape, with the fastening sections forming the U limbs connected by the carrier.

In accordance with a preferred embodiment, the length of each U limb is smaller than the length of the carrier.

Each fastening section can in particular comprise at least one, preferably precisely one, fastening means and/or one opening for receiving at least one fastening means. The fastening means can, for example, be a screw or a pin.

Alternatively or additionally, it is also possible to provide at least one, preferably precisely one, fastening means and/or an opening for receiving at least one fastening means, e.g. a screw or a pin, at the carrier, in particular between the fastening sections.

In accordance with a further embodiment, the fastening sections form an introduction opening which opens into the receiving opening and in particular tapers in the direction of the receiving opening in funnel, cup or trumpet shape. A flange can in this manner be guided by the fastening sections during the pushing onto the support section. An exact and secure positioning of the flange on the receiving apparatus is thus made possible in a simple manner.

The invention additionally relates to a vacuum pump, in particular to a turbo pump, having a flange which is configured for reception in a receiving apparatus in accordance with the invention. Such a vacuum pump can in particular also be fastened to a recipient in a simple manner in tight space conditions and with restricted access possibilities.

In accordance with an embodiment, the flange of the vacuum pump has a first fastening side for the receiving apparatus and a second fastening side disposed opposite the first fastening side and differing from the first fastening side. Said second fastening side is configured for the direct fastening to the recipient, in particular by means of separate fastening means, preferably screws, pins or the like. The flange can thus first be pushed onto the support section of the receiving apparatus. The vacuum pump can bring into a position by a subsequent tilting in which the flange of the recipient and the flange of the vacuum pump are orientated in parallel with one another. The second fastening side can now be fastened to the flange with the aid of the separate fastening means. The flange of the vacuum pump is brought into its final position in this manner. A sealing between the vacuum pump and the recipient is ensured in this end position.

In accordance with a further embodiment, the flange has at least one tongue which can be pushed into the receiving opening of the receiving apparatus.

The width of the tongue is preferably larger than a third, a half, or two thirds of the width of the flange. The tongue is thus large enough to be able to lie on the support section in a stable manner. Alternatively, a plurality of narrower, mutually spaced apart tongues can be provided with which the vacuum pump lies on the support section.

In accordance with a further embodiment, the flange has an abutment section for the fastening section at at least one corner region. the abutment section in particular being concavely shaped or chamfered. If the flange is pushed onto the carrier, the abutment section abuts the fastening section on reaching a specific insertion depth. The final position of the flange can thus be fixed in a simple manner. Optionally provided separate fastening means of an oppositely disposed fastening side of the flange are now also automatically located at the correct position beneath the recipient.

Finally, the invention also relates to a system comprising a receiving apparatus in accordance with the invention and a vacuum pump in accordance with the invention.

In accordance with an embodiment, the flange closes at least substantially flush with the fastening section at an upper side facing the recipient in the assembly state. A vacuum-tight connection between the vacuum pump and the recipient can thereby in particular be ensured in a simple manner.

In accordance with a further embodiment, at least one abutment section of the flange which abuts the part of the flange which can be pushed into the receiving opening is configured as an end abutment cooperating with the fastening section and bounding the insertion depth. An exact positioning of the flange is thereby so-to-say automatically made possible.

In accordance with a further embodiment, the flange is shaped at least substantially complementary to the receiving opening and to an introduction opening formed by two fastening sections. The flange, in particular a tongue of the flange, can thus be introduced into the receiving opening with an exact fit so that the vacuum pump can be brought into the correct assembly position relative to the recipient in a simple and reliable manner.

BRIEF DESCRIPTION OF THE DRAWINGS

The invention will be described in the following by way of example with reference to the drawings. There are shown:

FIG. 1 an embodiment of a system comprising a receiving apparatus in accordance with the invention and a vacuum pump in accordance with the invention;

FIG. 2a a plan view of the receiving apparatus in accordance with FIG. 1;

FIG. 2b a front view of the receiving apparatus in accordance with FIG. 1;

FIG. 3a a plan view of a further embodiment of a receiving apparatus in accordance with the invention;

FIG. 3b a front view of the receiving apparatus In accordance with FIG. 3a; and

DETAILED DESCRIPTION OF THE PREFERRED EMBODIMENTS

Figure 4:
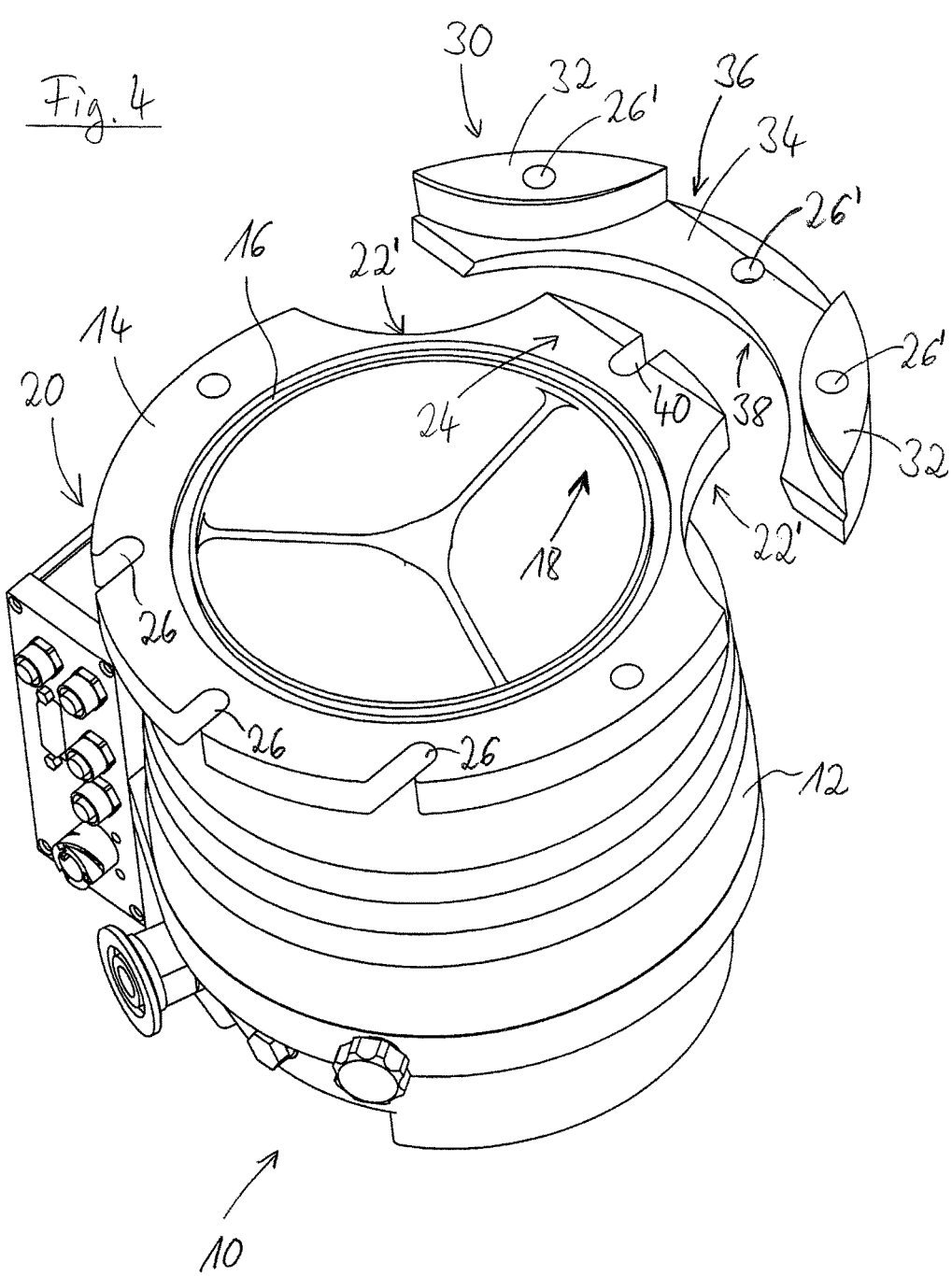
FIG. 4 a further embodiment of a system comprising a receiving apparatus in accordance with the invention and a vacuum pump in accordance with the invention.

A vacuum pump 10 in accordance with the invention is shown in FIG. 1. It comprises a pump body 12 and a flange 14. The flange 14 can be fastened to a recipient, not shown. The flange 14 and a flange of the recipient can be sealed in a vacuum-tight manner with respect to one another with the aid of an O ring 16.

The flange 14 has a first fastening side 18 and a second fastening side 20. The first fastening side 18 comprises two concavely shaped corner regions 22 as well as a tongue 24. The second fastening side 20 has cut-outs 26 for fastening means configured as screws 28.

The flange 14 is partly pushed onto a receiving apparatus 30. The receiving apparatus 30 comprises two fastening sections 32 as well as a support section configured as a carrier 34.

A plan view and a front view of the receiving apparatus 30 are shown in FIGS. 2a and 2b.

The carrier 34 extends between the fastening sections 32 and is provided with a concave recess which is shaped such that the carrier 34 is hereby adapted to the cylindrical shape of the pump body 12 of the vacuum pump 10. In addition, the carrier 34 is slightly downwardly chamfered in the direction of the concave recess, starting from a rear region, to facilitate the introduction of the tongue 24 of the flange 14.

An alternative embodiment of a receiving apparatus 30 is shown in FIGS. 3a and 3b. The carrier 34 is in this respect configured as straight and has neither a concave recess nor a chamfer.

In both embodiments, the respective fastening sections 32 project beyond the carrier 34 and form the limbs of a U. A cut-out 26' for a screw 28' is provided in each fastening section 32.

The fastening sections 32, together with the carrier 34, define a receiving opening 36 for the tongue 24 of the flange 14.

To simplify the introduction of the tongue 24 into the receiving opening 36, the fastening sections 32 are rounded such that they form an introduction opening 38 tapering in the direction of the receiving opening 36.

A further embodiment of a vacuum pump 10 in accordance with the invention is shown together with the receiving apparatus 30 in FIG. 4. The receiving apparatus 30 is configured in arcuate or boomerang shape. The carrier 34 is in particular curved at both sides so that the fastening sections 32 arranged at the carrier 34 complement the flange 14 to form a complete flange again in the assembly state, said flange being interrupted—in comparison with a standard flange—by material removal in the form of concave cut-outs 22'. In other words, the original standard flange of the vacuum pump is formed as with a jigsaw puzzle by assembling the pump and the receiving apparatus, i.e. by inserting the tongue 24 of the flange 14 between the fastening sections 32 and inserting the fastening sections 32 into the cut-outs 22' of the flange 14.

The minimization of the fastening surface associated therewith, i.e. the maintenance of the outline of a standard flange cannot only be realized in accordance with the invention with the flange 14 shown here with a circular outline, but also with differently shaped flanges which e.g. have straight side sections or which are shaped as oval, elliptical or irregular.

The carrier 34 comprises a further cut-out 26' to secure the receiving apparatus 30 additionally to the recipient. To be able to push the tongue 24 into the receiving opening 36 when a screw 28' is located in this cut-out 26' of the carrier 34, the tongue 24 has a tongue cut-out 40.

To connect the vacuum pump 10 to a recipient, the receiving apparatus 30 is first installed at the recipient or at a flange thereof with the aid of the fastening sections 32. For this purpose, the receiving apparatus 30 is screwed to the recipient by screws 28' which are guided through the cut-outs 26'. The receiving apparatus 30 is additionally optionally screwed via a cut-out 26' of the carrier 34.

Subsequently, the vacuum pump 10 is pushed with the tongue 24 of its flange 14 into the receiving opening 36, i.e. onto the carrier 34, so that the tongue 24 of the flange 14 lies on the carrier 34. The rounded shape of the fastening sections 32 in this respect facilitates the pushing on since the tongue 24 is guided.

The corner regions 22 of the flange 14 abut the correspondingly shaped fastening sections 32 as soon as the flange 14 is located in the correct position relative to the recipient. A continued insertion of the flange 14 into the receiving opening 36 is suppressed by this end abutment. The vacuum pump 10 is now tilted upwardly so that the flange 14 of the vacuum pump 10 and the flange of the recipient lie on one another in a planar manner, wherein the cut-outs 28 in the flange 14 formed at the oppositely disposed side are aligned exactly with corresponding openings in the recipient flange due to the positioning of the flange 14 by the receiving apparatus 18. The screws 28, which are guided through the cut-outs 26, are subsequently screwed to the flange of the recipient so that the fastening of the vacuum pump 10 at the recipient is complete.

The vacuum pump 10 and the recipient are sealed with respect to one another by the O ring 16.

The screws 28 are first released for dismantling the vacuum pump 10. The flange 14 can subsequently be pulled out of the receiving opening 36. With a removed vacuum pump 10, the receiving apparatus 30 can now be dismantled if required in that the screws 28' are unscrewed.

In accordance with the invention, vacuum pumps can be assembled and dismantled in a simple manner even in regions which are difficult to access since a single access side is in particular sufficient for this purpose.

What is claimed is:

1. A receiving apparatus (30) for partially receiving a flange (14) forming part of a vacuum pump (10) for facilitating attachment of the vacuum pump to a recipient, the receiving apparatus comprising:
   two, spaced from each other, fastening sections (32) for being fastened to a recipient and each having at least one of fastening means for connecting the receiving apparatus with the vacuum pump flange and an opening for receiving the fastening means,
   a carrier (34) extendable between the two fastening sections and forming a support section on which the vacuum pump flange (14) lies in an assembled state and defining an opening (36) for receiving the vacuum pump flange (14),
   wherein the flange (14) can be pushed into the receiving opening (36) and can be pulled out of the receiving opening (36) from an access side of the receiving apparatus (30) with the receiving apparatus (30) being fastened to the recipient, and
   wherein at least one of the two fastening sections has the fastening means extendable beyond an upper side of the receiving apparatus located opposite the access side and facing the recipient for connecting the receiving apparatus (30) with the recipient.

2. A receiving apparatus (30) in accordance with claim 1, wherein the support section (34) is set back with respect to the fastening sections (32) at an upper side of the receiving apparatus (30) facing the recipient in the assembled state.

3. A receiving apparatus (30) in accordance with claim 1, wherein the receiving apparatus (30) is configured at least substantially in a U shape, with the fastening sections (32) forming the U limbs connected by the carrier (34).

4. A receiving apparatus (30) in accordance with claim 3, wherein the length of each U limb is smaller than the length of the carrier (34).

5. A receiving apparatus (30) in accordance with claim 1, wherein the fastening sections (32) form an introduction opening (38) opening into the receiving opening (36) and tapering in the direction of the receiving opening (36).

6. A receiving apparatus (30) in accordance with claim 5, wherein the introduction opening (38) is tapering in the direction of the receiving opening (36) in a funnel shape, a cup shape or a trumpet shape.

7. A receiving apparatus (30) for partially receiving a flange (14) forming part of a vacuum pump (10) for facilitating attachment of the vacuum pump to a recipient, the receiving apparatus comprising:
   at least one fastening section (32) for being fastened to a recipient and having at least one of fastening means for connecting the receiving apparatus with the vacuum pump flange and an opening for receiving the fastening means; and
   a support section on which the vacuum pump flange (14) lies in an assembled state and defining an opening (36) for receiving the vacuum pump flange (14),
   wherein the flange (14) can be pushed into the receiving opening (36) and can be pulled out of the receiving opening (36) from an access side of the receiving apparatus (30) with the receiving apparatus (30) fastened to the recipient, and wherein the at least one fastening section has the fastening section means extendable beyond an upper side of the receiving apparatus located opposite the access side and facing the recipient for connecting the receiving apparatus (30) with the recipient.

8. A receiving apparatus according to claim 7, wherein the flange (14) of the vacuum pump (10) has a first fastening side (18) being received in the opening (36) for the receiving apparatus (30) and a second fastening side (20) disposed opposite the first fastening side (18), the second fastening side being configured for a direct fastening to the recipient.

9. A receiving apparatus in accordance with claim 7, wherein the first fastening side of the flange (14) has at least one tongue (24) insertable into the receiving opening (36) defined by the support section.

10. A receiving apparatus according to claim 9, wherein a width of the tongue (24) is larger than a third, a half or two-thirds of a width of the flange (14).

11. A receiving apparatus according to claim 7, wherein the flange (14) has an abutment section engageable with the at least one fastening section (32) at a corner region (22) thereof.

12. A vacuum pump (10) in accordance with claim 11, wherein the abutment section has a concave shape, complementary to a convex shape of the support surface.

\* \* \* \* \*